United States Patent

[11] 3,604,442

| [72] | Inventor | Henry G. Tucker |
| | | Norwalk, Conn. |
| [21] | Appl. No. | 752,865 |
| [22] | Filed | Aug. 15, 1968 |
| [45] | Patented | Sept. 14, 1971 |
| [73] | Assignee | Remington Arms Company, Inc. |
| | | Bridgeport, Conn. |

[54] FLUIDIC DIODE
7 Claims, 21 Drawing Figs.

[52] U.S. Cl. ................................................ 137/81.5
[51] Int. Cl. ................................................. F15c 4/00
[50] Field of Search ................................... 137/81.5

[56] References Cited
UNITED STATES PATENTS

| 3,472,256 | 10/1969 | Hartman | 137/81.5 |
| 3,472,258 | 10/1969 | Blosser, Jr. | 137/81.5 |
| 3,480,030 | 11/1969 | Bermel | 137/81.5 |
| 3,481,353 | 12/1969 | Hatch, Jr. | 137/81.5 |
| 3,500,846 | 3/1970 | Wood | 137/81.5 |
| 1,329,559 | 2/1920 | Tesla | 137/81.5 X |
| 3,068,880 | 12/1962 | Riordan | 137/81.5 |
| 3,191,623 | 6/1965 | Bowles | 137/81.5 |
| 3,375,842 | 4/1968 | Reader | 137/81.5 |
| 3,461,897 | 8/1969 | Kwok | 137/81.5 |

FOREIGN PATENTS

| 1,391,362 | 1/1965 | France | 137/81.5 |

OTHER REFERENCES

" The Amateur Scientist," Scientific American, C. L. Stong, Vol. 207, No. 2, Aug. 1962, pp. 128– 138. (copy in Scien. Lib. & Gp. 362, 137/81.5)

*Primary Examiner*—Samuel Scott
*Attorney*—D. Verner Smythe

ABSTRACT: A fluidic diode wherein the forward direction input conduit angularly intersects a second conduit, the area of the second conduit from its intersection point to the forward direction output being smaller than the area of the second conduit from the intersection to the reverse direction output or vent. The wall of the second conduit toward the reverse direction output can be offset relative to the wall closest to the forward direction input conduit. The vent can be in the form of a vortex-producing chamber.

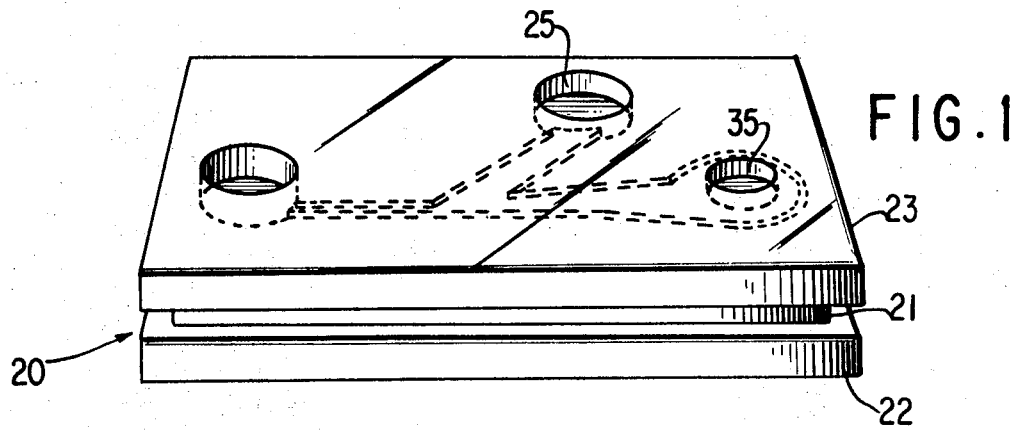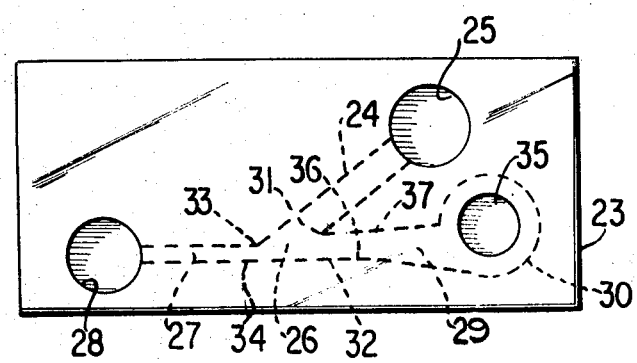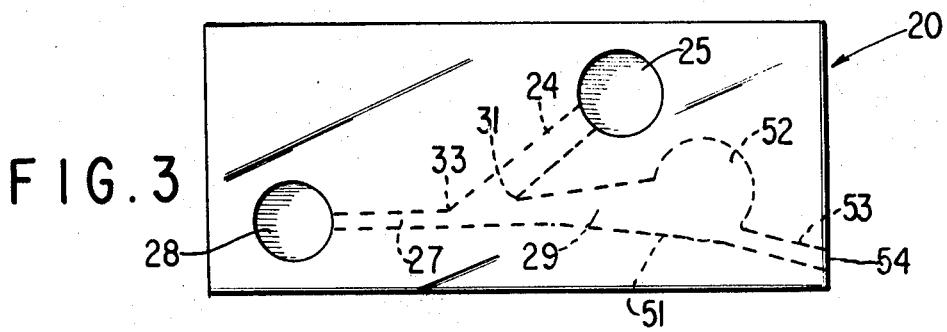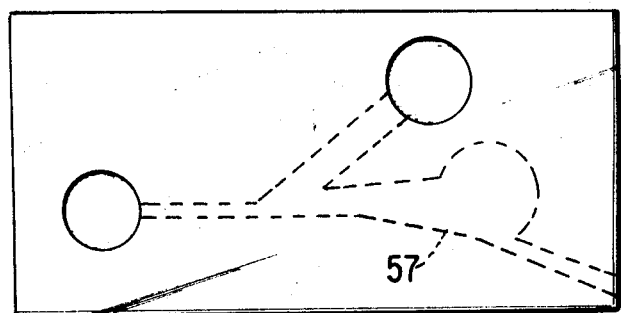

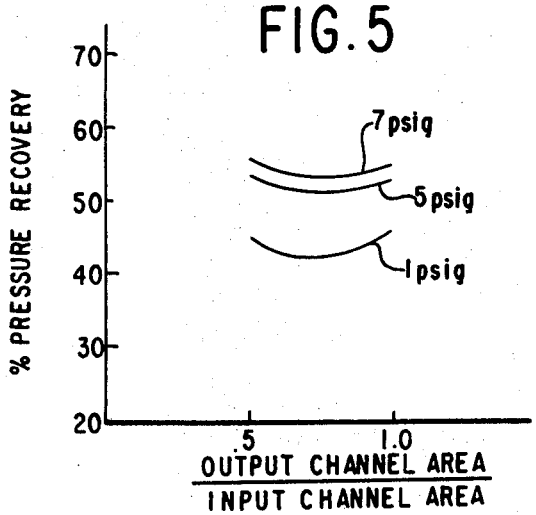
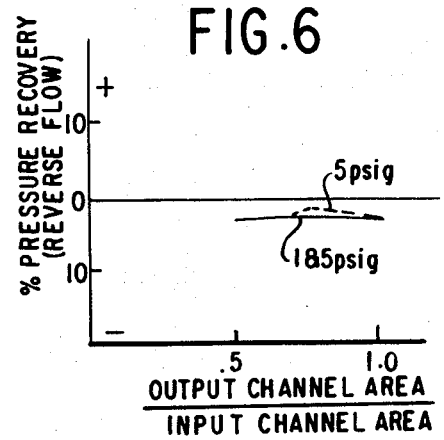
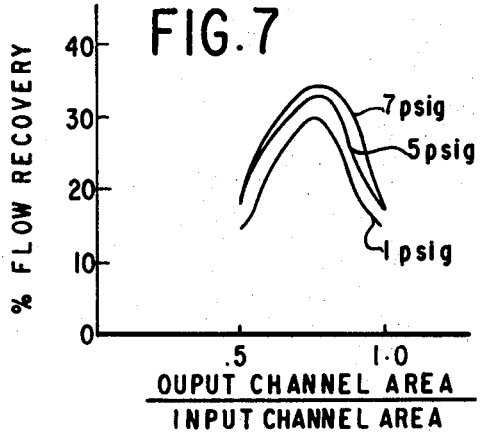
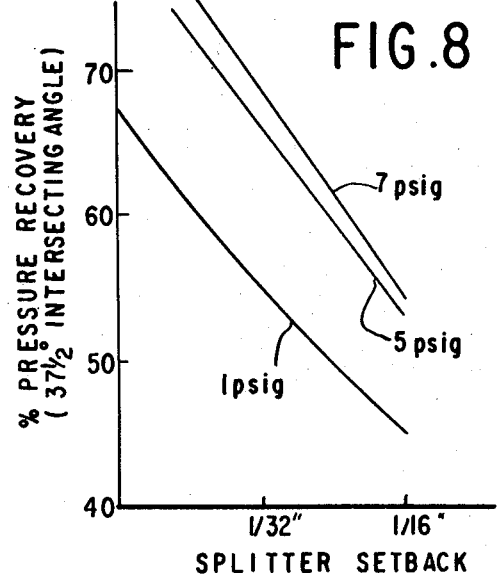
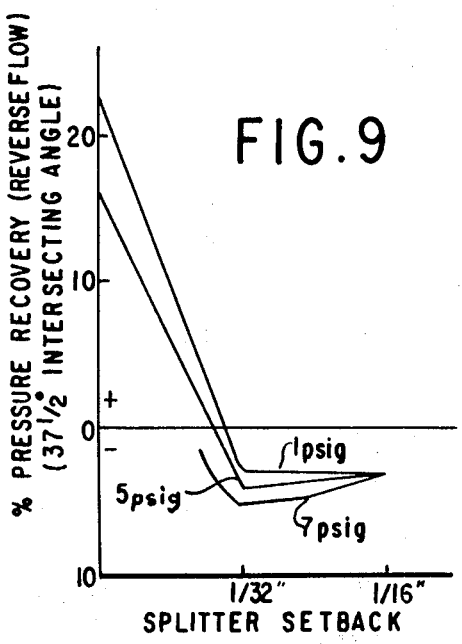
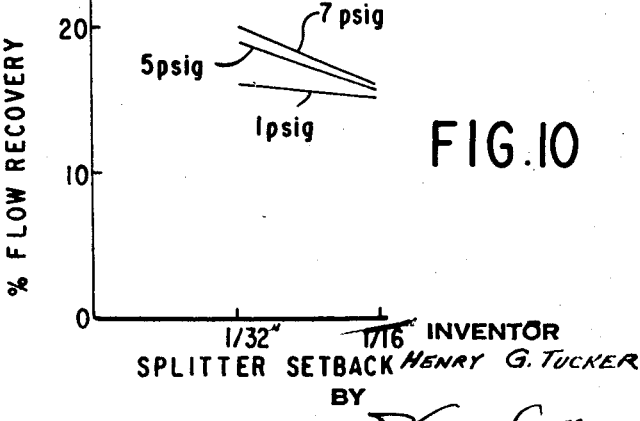

INVENTOR
HENRY G. TUCKER
BY
D. Verner Smythe
ATTORNEYS

FLUIDIC DIODE

This invention relates to fluidic or pneumatic diodes having passages so related as to obtain optimum performance.

It is desirable in a fluidic diode to obtain as high a flow and pressure recovery in the forward direction while obtaining as high a front-to-back reverse flow ratio as possible. This requires the proper relationship of the parts in order to obtain the optimum results.

One of the objects of the invention is to provide a fluidic diode with design features which optimize the combination of pressure and flow recoveries while maintaining a high front-to-back ratio.

In one aspect of the invention, the fluidic diode may consist of a support or base having a first input conduit means therein, said input conduit having a connection to a source of input fluid or air. The diode has a second conduit means which has a forward direction input passage from the outlet of the first conduit means. The first conduit intersects the second conduit and at the end of the second conduit there is a forward direction output passage. The axes of flow in a forward direction from the first conduit means to the second conduit means are angularly disposed relative to each other. A third or reverse flow conduit means extends from the intersection of the first conduit and the second conduit means to a venting outlet passage. The reverse flow conduit means is connected to an exhaust or vent arrangement at the end thereof as will be described hereafter.

In a further aspect of the invention, the cross-sectional area of the first conduit means, at least adjacent the intersection of the first and second conduit means, is greater than the cross-sectional area of the second conduit means which leads from the intersection to the forward direction output means.

In a still further aspect, the wall of the reverse flow conduit means adjacent the intersection can be set back in relation to the wall of the second conduit means which extends toward the second conduit means output passage. Thus, the second conduit means is smaller relative to the reverse flow conduit means. The reverse flow conduit means can expand in size or cross-sectional area until it reaches the vent point or vent chamber. To avoid oscillations at certain pressures, there may be a short section or land defining a parallel conduit portion before the outward expansion. The difference in the dimension of the reverse flow conduit and the second conduit from an extension of the second conduit means can be termed the "splitter set back." The vent chamber can take various forms. Preferably, the vent chamber creates a vortex to assist flow of fluid thereto when a reverse direction flow takes place. The vortex chamber may have a tangential output or it may have an outlet vertically arranged to a central portion thereof. Among other relationships, the diode should be dimensioned and arranged so that when operated in a reverse flow direction, the pressure of the input conduit is negative throughout the entire range while maintaining high pressure and flow recovery in the forward direction.

These and other objects, advantages and features of the invention will become apparent from the following description and drawings which are merely exemplary.

In the drawings:

FIG. 1 is a perspective view of one form of the invention;

FIG. 2 is a reduced size plan view of FIG. 1;

FIG. 3 is similar to FIG. 2 except that the vent chamber is in a different form;

FIG. 4 is similar to FIG. 2 except a still further form of vent chamber is illustrated;

FIG. 5 is a graph showing the percent pressure recovery for various input pressures with a change in ratio of cross-sectional area of the forward direction output conduit and the input conduit;

FIG. 6 shows the front-to-back pressure recovery as being negative and essentially flat, with ratio change of channel area.

FIG. 7 is similar to FIG. 6 except that the percent flow recovery is shown with ratio change of channel areas.

FIG. 8 is a graph showing the effect of the splitter wall set back change on pressure recovery at various pressures when flow is in the forward direction;

FIG. 9 is similar to FIG. 8 except that flow is in the reverse direction;

FIG. 10 is similar to FIG. 8 except that the effect on flow recovery is shown;

Figure 17:
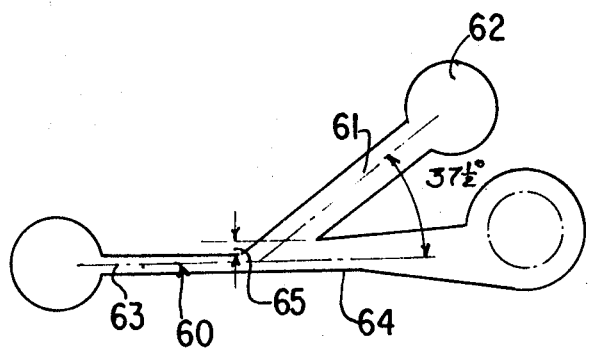
FIG. 17 is one form of an optimized device.

FIGS. 18, 19, 20, and 21 are curves showing the operation of FIG. 17.

The diode of the invention can take various forms. In FIG. 1, the diode assembly 20 may comprise plate 21 having conduit or channels therein. The passages or channels may be formed in accordance with the teachings in the U.S. Pat. Nos. to Plambeck 2,760,863 and 2,791,504. As explained therein, the images of the various passages can be photographically transferred to a photopolymerizable material and the passages then formed. Other means, of course, such as etching, casting or molding could be used. Backplate 22 and front plate 23 can be suitably joined to the plate 21 and front plate 23 can have the various apertures cut therein or formed therein connecting with the various passages.

Referring to FIGS. 1 and 2, a first conduit means 24 has a forward direction input connection 25, the conduit input passage 24 terminating in an orifice 26 where it intersects the second or forward direction conduit means 27. Forward direction conduit means 27 has a forward output pressure connection or passage 28. Extending in the opposite direction is the third or reverse flow conduit means 29, said reverse flow conduit means terminating in a vortex or vent chamber 30. As will be explained hereafter, the cross-sectional area of the first conduit means 24 preferably is greater than the second conduit means 27.

Describing the operation for fluid flow in a forward direction through input passage 25 and conduit 24, the flow will pass into second conduit 27 so as to provide a signal at the forward direction output passage 28. If flow is in the opposite or reverse direction or from forward output passage 28, it will pass into conduit 29 and out of vent 30.

In the form shown in FIG. 2, the "splitter" 31 is at the junction of the first conduit means and the reverse-flow conduit 29. The distance from the point 31 of the splitter to the opposite wall 32 is made greater than the distance between wall 33 and wall 34 of the second conduit means 27, for reasons that will be explained hereafter.

In the form shown in FIG. 2, vent chamber 30 is arranged as a vortex chamber having a vent passage 35 extending at right angles to the flow through reverse flow passage 29.

In the form shown in FIG. 2, wall 36 can be extended beyond the splitter 31 until it reaches the diverging wall area 37. The straight land does not necessarily have to be used.

In FIG. 3 the same reference numerals are used, where appropriate, as in FIGS. 1 and 2. FIG. 3 illustrates a different type of vortex chamber, the chamber 50 having diverging walls 51, 52 and an exit or vent 53 which is tangential to the lower wall 51. The outlet vent passage 54 is on a plane relative to support 21.

A still further form of vent is shown in FIG. 4, the same reference numerals being used for the same parts. In FIG. 4, vortex chamber 55 is similar in shape to that of FIG. 2. A vent passage 56 is arranged substantially tangential to the lower wall 57 of the vortex chamber and is connected to the vent passage 58.

Operation of the various forms of the invention will now be described, reference being made to the various graphs. In the various graphs flow measurements were made using a conventional rotometer and first measuring at the input side of the diode and then measuring the output side with the same rotometer.

FIGS. 5, 6 and 7 show relations between pressure and flow recovery for various pressures with changes in the ratio of cross-sectional areas of the forward direction or second conduit and the first or input conduit. FIGS. 5 and 6 illustrate that there is little effect on pressure recovery in the forward or reverse direction with change of area ratio. FIG. 7, however, shows a distinct peak of flow recovery with the ratio of output channel area to input channel area of about 0.75.

FIGS. 8, 9 and 10 show relations of pressure and flow recovery with changes in the splitter set back. In FIG. 8, it can be seen that with a decrease in splitter set back and as zero is approached, the percent of pressure recovery becomes greater. In FIG. 9, which shows reverse flow characteristics, as zero is approached there is a positive pressure recovery rather than the desired negative pressure recovery. However, at a set back of approximately one thirty-second inch, a negative pressure occurs and as the set back is increased, the front-to-back ratio is substantially level. However, as the set back increases beyond one-sixteenth inch, the pressure recovery will be affected. FIG. 10 shows that flow recovery decreases when the set back is greater than approximately one thirty-second inch.

Figure 11:
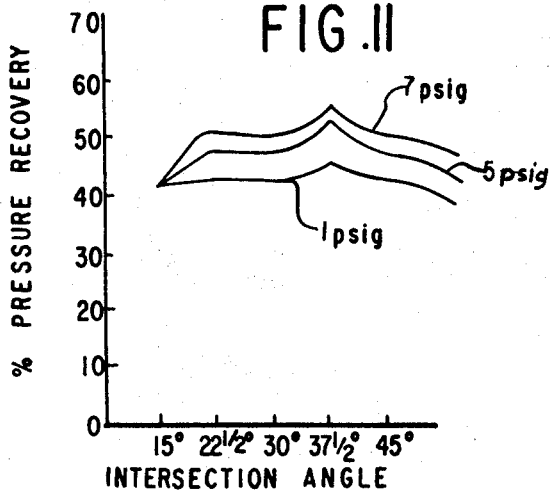
FIG. 11 is a graph showing the effect of change of the intersection angle of the first and second conduit means on pressure recovery when flow is in a forward direction.
Figure 12:
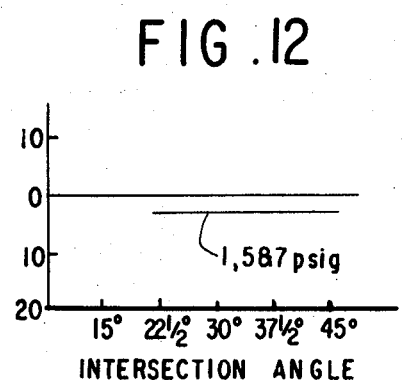
FIG. 12 is similar to FIG. 11 except that flow is in the reverse direction.
Figure 13:
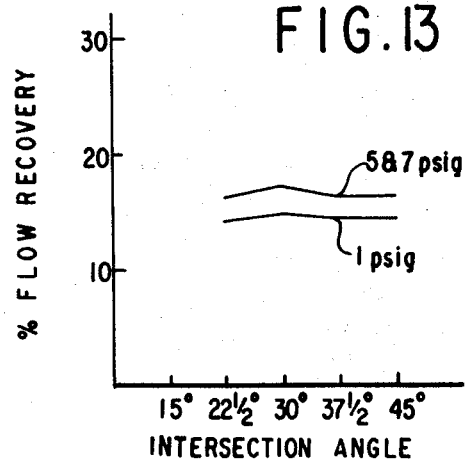
FIG. 13 is similar to FIG. 11 except that the effect on flow recovery is shown.

FIGS. 11, 12 and 13 illustrate the effect of change of intersection angle of the first and second conduit means on pressure recovery and flow recovery. In FIG. 11, there is a peak at 37.5° but there also is a substantially flat response from about 22.5° to about 45°. In FIGS. 5 to 10, the intersection angle is 37.5°. FIG. 12 shows the relationship with reverse flow, the response being negative and substantially flat. In FIG. 13, the flow recovery also is seen to be substantially flat.

Figure 14:
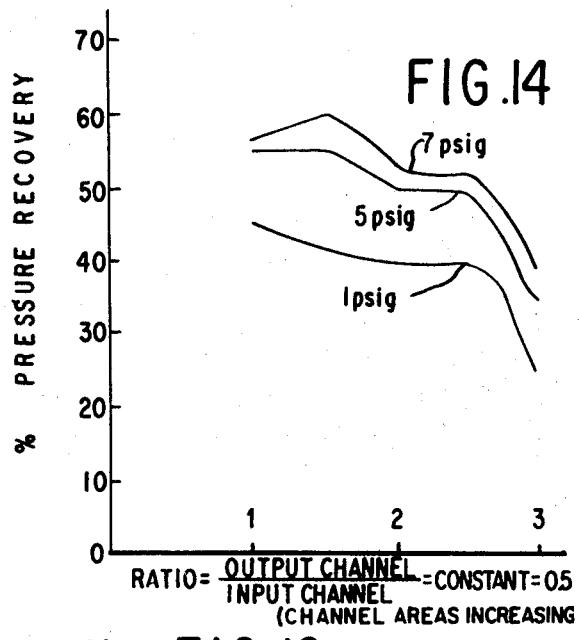
FIG. 14 is a graph showing the effect on pressure recovery at various input pressures when the conduit sizes are increased, the ratio of the output channel area and the input channel area remaining constant, the ratio being 0.5.
Figure 15:
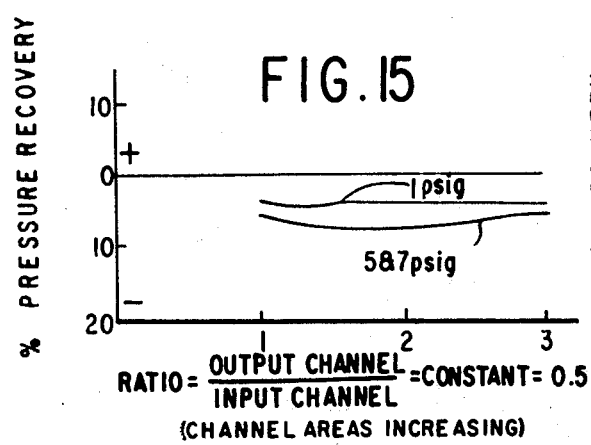
FIG. 15 is similar to FIG. 14 except that the flow is in the reverse direction.
Figure 16:
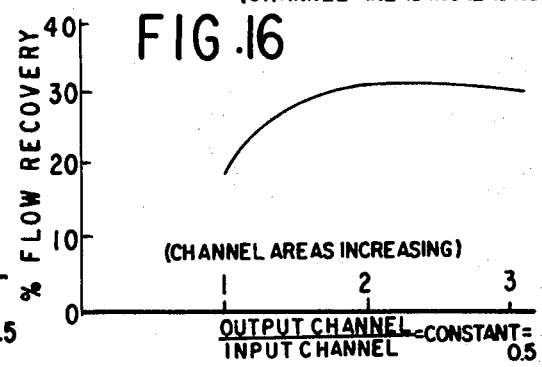
FIG. 16 is similar to FIG. 14 except that the effect on flow recovery is shown.

FIGS. 14, 15 and 16 show the effect of "scaling" or increasing the areas involved with a constant relation between the area of the output channel and the input channel. In the graphs, the ratio between areas was fixed at 0.5. In FIG. 14 there is a peak in pressure recovery at a scaling factor of 1.5. The starting point for scaling is at a channel depth of 0.042 inch and widths of 0.031 inch and 0.062 inch. The reverse flow recovery as seen in FIG. 15 is to be substantially constant. In FIG. 16, the flow recovery becomes level at a scaling factor of 1.5 and stays substantially level between 1.5 and 3.0.

In FIG. 17 there will be found one optimum example second conduit channel 60 cross-sectional area having a ratio of 0.75 relative to the first conduit means 61. The angle between axis 62 and 63 is 37½°, the land 64 length is one-sixteenth inch and the splitter set back 65 is one thirty-second inch.

The operating characteristics for a diode combining these optimum parameters are shown in FIGS. 18, 19, 20 and 21.

Figure 18:
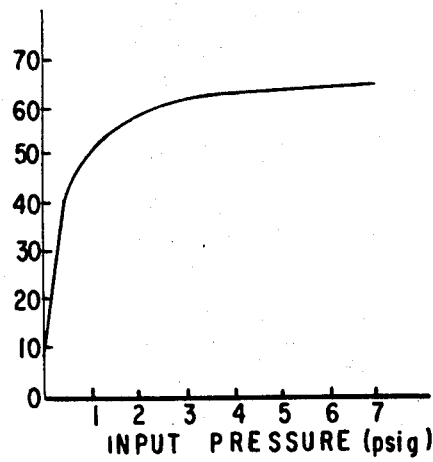

In FIG. 18 the forward pressure recovery is shown. The recovery reaches approximately 65 percent at a 3 p.s.i.g, input and remains essentially constant in the range tested.

Figure 19:
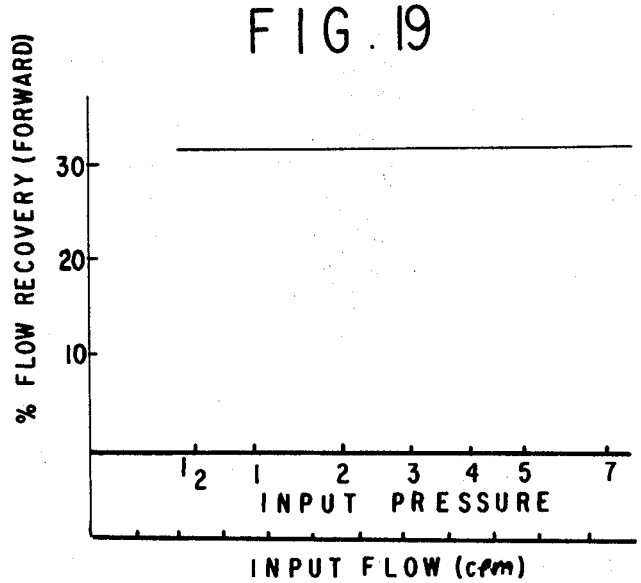

In FIG. 19 the forward flow recovery is shown. The recovery is essentially constant throughout the range.

Figure 20:
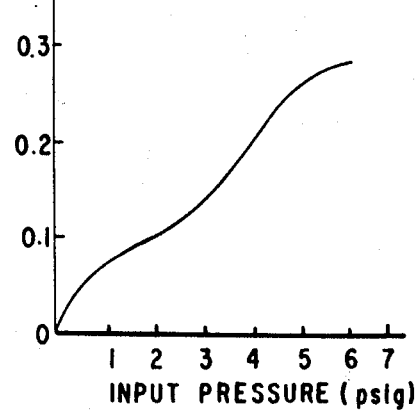

In FIG. 20 the reverse flow characteristics show an increasing vacuum with increasing input pressure.

Figure 21:
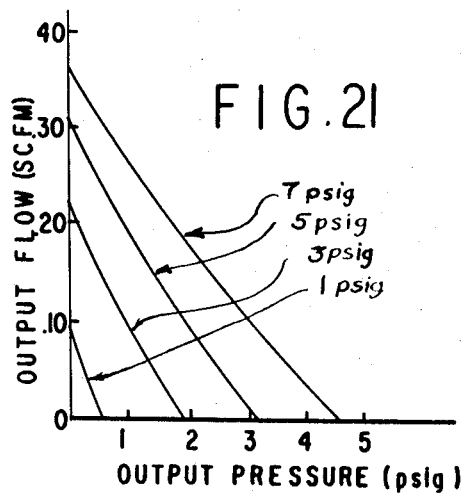

In FIG. 21 the forward output flow and pressure recovery are shown for different supply pressures under varying load conditions.

It should be apparent that variations may be made in details of construction without departing from the spirit of the invention except as defined in the appended claims.

What is claimed is:

1. In a fluidic diode, the combination including support means, first conduit means in said support means having a forward direction input, a second conduit means intersected by said first conduit means intermediate the ends of said second conduit means, the axes of flow of said first and second conduit means being angularly disposed relative to each other, forward direction output means at one end of said second conduit means in the direction of forward flow and reverse direction exhaust means at the other end thereof, the cross-sectional area of said first conduit means adjacent the intersection of said first and second conduit means being greater than the cross-sectional area of said second conduit means leading from said intersection to said forward direction output means.

2. A device as in claim 1 wherein the cross-sectional area leading to the forward direction output passage is between about 65 percent and 85 percent of the area of the first conduit means.

3. A device as in claim 1 wherein the wall of the reverse direction passage is set back at least one thirty-second inch relative to the wall of the forward direction output passage.

4. A device as in claim 3 wherein the set back is between one thirty-second inch and one-sixteenth inch.

5. A fluidic diode as in claim 1 wherein the reverse direction output is a vortex chamber.

6. A fluidic diode as in claim 5 wherein the vortex chamber has a tangentiallike vent.

7. A fluidic diode as in claim 5 wherein the vortex chamber has a central vent at right angles thereto.